(12) United States Patent
Stephens

(10) Patent No.: US 6,424,816 B1
(45) Date of Patent: Jul. 23, 2002

(54) STATISTICAL COMMUNICATION LINK

(75) Inventor: Scott A. Stephens, Manhattan Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/662,047

(22) Filed: Sep. 15, 2000

Related U.S. Application Data

(62) Division of application No. 09/095,215, filed on Jun. 10, 1998, now Pat. No. 6,219,524.

(51) Int. Cl.$^7$ .......................... H04B 17/00; H04H 9/00
(52) U.S. Cl. ..................................... 455/2.01
(58) Field of Search .................. 455/2.01, 405, 455/12.1, 226.1; 348/1

(56) References Cited

U.S. PATENT DOCUMENTS

| | | | | |
|---|---|---|---|---|
| 5,278,988 A | * | 1/1994 | Dejean et al. | 455/2.01 |
| 5,896,554 A | * | 4/1999 | Itoh et al. | 455/2.01 |

* cited by examiner

*Primary Examiner*—Nguyen T. Vo
(74) *Attorney, Agent, or Firm*—Harness, Dickey & Pierce, P.L.C.

(57) ABSTRACT

A communications system (34) that monitors a state of a plurality of radios (10). In one embodiment, the communications system (34) automatically and continuously monitors the number of radios (10) tuned to each of a plurality of available radio stations. Each radio (10) generates a coded signal depending on which radio station the radio (10) is currently tuned to. The coded signal is applied to a frequency generator (32) that generates a unique frequency signal for each code that is then transmitted by the radio (10). Each radio (10) tuned to the same station would transmit the same unique frequency signal at substantially the same power level. The frequency signals transmitted by all of the radios (10) are received by a receiver (34), such as a satellite-based receiver (34), that separates the signals by frequency. The power received for each different frequency signal is then measured to give a total power output for that frequency. An estimation of the number of transmission for each different frequency signal is determined as the measured power level minus the expected receiver noise power, divided by the expected received power from a transmission from a single radio (10).

4 Claims, 2 Drawing Sheets

STATISTICAL COMMUNICATION LINK

This application is a divisional application of Ser. No. 09/095,215, filed Jun. 10, 1998, now U.S. Pat. No. 6,219,524.

BACKGROUND OF THE INVENTION

1. Field of the Invention

The present invention relates generally to a communications system for determining a state of a transmitter and, more particularly, to a communications system for providing an estimation of the number of radios tuned to each of a plurality of radio stations, where the system does not specifically identify a particular radio.

2. Discussion of the Related Art

Digital audio radio systems (DARS) that generate compressed digital audio signals to be transmitted by a digital audio transmission source and reproduced in a receiver associated with the DARS are known in the art. Audio signals to be broadcast by the DARS are generated in a broadcast studio and then converted to digital data. The digital data radio signals are then sent to an earth based ground transmission station to be transmitted to a plurality of receivers within a reception area, or to be transmitted to one or more satellites orbiting the earth in a geosynchronous orbit. The satellites then transmit the digital radio signals to a defined reception area over the Earth. U.S. Pat. No. 5,592,471 issued to Briskman, Jan. 7, 1997, discloses a digital radio system of this type.

For DARS that use satellite communications, the compressed digital data is sent to the earth based ground station for transmission to one or more satellites on a radio frequency "uplink" carrier. The satellite receives the uplink signals from the ground station and then re-transmits the signals to a defined area on the earth's surface where radio reception is desired. For example, the satellite can have a "downlink" beam pattern that covers the continental Untied States. The receiver receives the downlink signal, decompresses it, and converts it back to an analog signal for both stereo channels using a digital-to-analog converter (DAC) for subsequent amplification and listening through speakers.

It would be highly valuable if radio station personnel, marketing analysts, potential advertisers and the like could automatically and readily obtain information concerning the number of radios that are tuned to the several available radio stations that are broadcasting radio signals at different times of the day. In other words, specific information concerning how many listeners are listening to a particular radio station at any given time would be valuable for advertising purposes. Currently, no practical technique exists for automatically determining what station a radio receiver is tuned to. Marketing personnel typically assess this information by specifically asking consumers what stations they listen to through questionnaires, surveys and the like. Obviously, this technique is limited in its accuracy, and the number of radio listeners able to be surveyed. A much better and more accurate surveying technique would be provided if the individual radios themselves transmitted a unique coded frequency based on the particular station that the receiver was tuned to, that was received and deciphered by a receiver.

It is possible to equip each radio with a conventional transmitter that transmits its own unique signal to identify which station the radio is currently tuned to. The individual radios could be separately identified based on different coding schemes, such as frequency division multiple access (FDMA), time division multiple access (TDMA), or code division multiple access (CDMA), known to those skilled in the art. For an FDMA implementation, each radio would require its own unique frequency spectrum to identify each individual radio and the station it is tuned to. However, because there would probably be millions of radios being monitored at a time, each having its own unique frequency spectrum, an identification system of this type would not be feasible because of the large amount of bandwidth required. Similarly for both CDMA and TDMA implementations, each radio would require its own unique code and time slot, respectively. As with FDMA, COMA and TDMA each require bandwidth in proportion to the number of communication links being transmitted. For the satellite DARS discussed above, bandwidth is at a premium. Because it is only necessary to provide an overall measurement of the average listenership per station, systems which identify the specific radio provide more information than is necessary for ratings purpose.

For a ratings service system to be feasible, it would need to identify the number of radios tuned to the particular radio stations in a more practical and cost effective manner than that discussed above. It is therefore an object of the present invention to provide a technique for determining a state of a transmitter without the need to provide each transmitter with its own unique frequency or code signal.

SUMMARY OF THE INVENTION

In accordance with the teachings of the present invention, a communications system is disclosed that automatically and continuously monitors a state of a group of transmitters. In one embodiment, the communications system monitors the number of radios tuned to each of a plurality of available radio stations. Each radio generates a coded signal depending on which radio station the radio is currently tuned to. The coded signal is applied to a frequency generator that generates a unique frequency signal for each code that is then transmitted by the radio. Each radio tuned to the sa me station would transmit the same unique frequency signal at substantially the same power level.

The frequency signals transmitted by all of the radios are received by a receiver, such as a satellite based receiver, that separates the signals by frequency. The power received for each different frequency signal is then measured to give a total power output for that frequency. An estimation of the number of transmissions for each different frequency signal is determined as the measured power level minus the expected receiver noise power, divided by the expected received power of a transmission from a single radio. Therefore, an estimation of the number of radios tuned to each radio station being monitored can be obtained.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a communications system for determining the number of radios currently tuned to each of a plurality of different radio stations is merely exemplary in nature, and is in no way intended to limit the invention or its applications or uses. For example, the discussion below is concerned with identifying the number of radios tuned to the available radio station at a given time. However, the teachings of the invention have a much wider application in that it can determine many states of a transmitter by the same technique.

Figure 1:
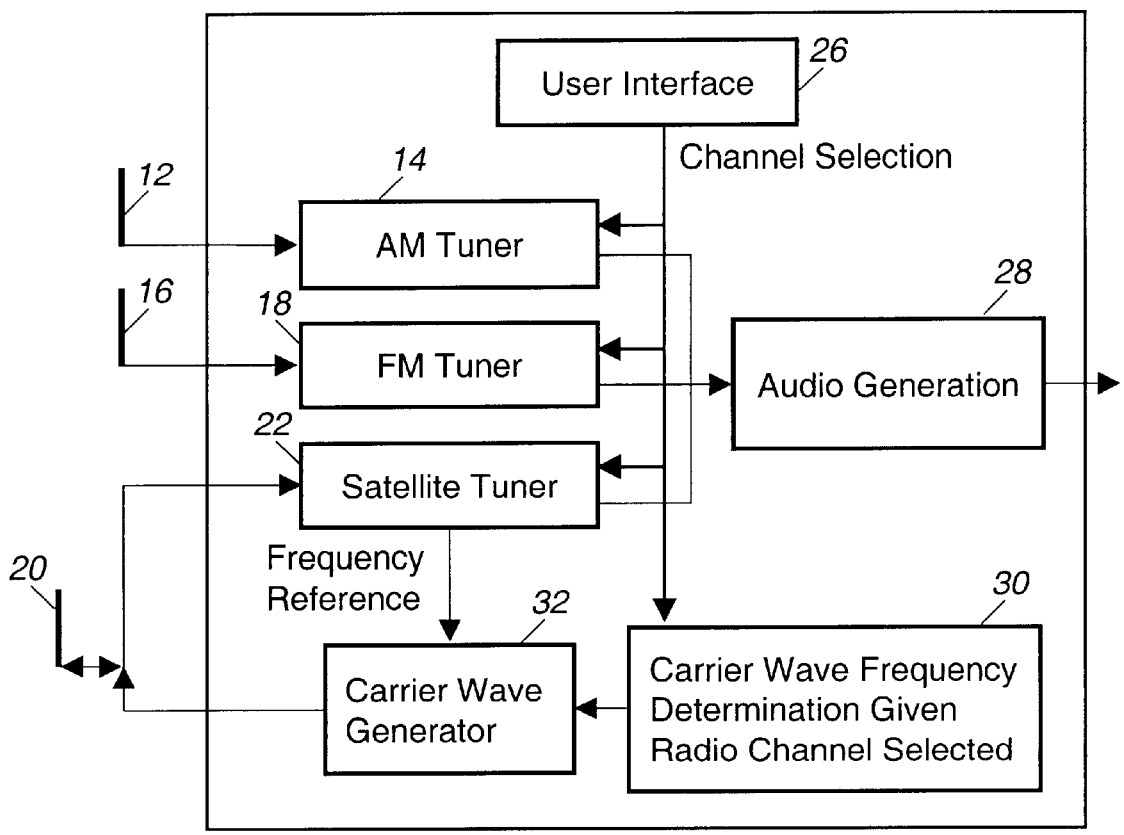
FIG. 1 is a block diagram of a radio incorporating a transmission system for transmitting a carrier wave frequency signal identifying which station the radio is currently tuned to, according to an embodiment of the present invention.

FIG. 1 shows a block diagram of a radio 10, such as a vehicle radio, that incorporates a system for transmitting a unique carrier frequency signal depending on which radio station the radio 10 is currently tuned to. The radio 10 includes an AM antenna 12 that collects and tunes AM (amplitude modulated) radio frequency signals, and sends the signals to an AM tuner 14 that filters and tunes a particular AM frequency bandwidth from an AM radio station. Additionally, the radio 10 includes an FM antenna 16 that collects and tunes FM (frequency modulated) radio frequency signals, and sends the signals to an FM tuner 18 that filters and tunes a particular FM frequency bandwidth from an FM radio station. The part of the radio 10 using the antennas 12 and 16, the AM tuner 14 and the FM tuner 18 are for conventional land-based radios, known in the art. Also, the radio 10 includes a satellite receive/transmit antenna 20 that receives satellite radio signals from a satellite (see FIG. 2), and sends the signals to a satellite tuner 22 that filters and tunes a particular frequency bandwidth from a satellite station. The satellite antenna 20 and the satellite tuner 22 can be the type used in association with a DARS referred to above, in combination with the conventional land-based AM and FM radio. The antenna 20 is also used to transmit a unique carrier frequency signal to the satellite based on which station the radio 10 is currently tuned to as will be described below. The tuners 14, 18 and 22 can be any type of suitable tuner for a particular heterodyne and/or satellite DARS known in the art.

The radio 10 includes a user interface 26 that allows the user of the radio 10 to select which station he desires to listen to for all of the available AM, FM and satellite stations. Depending on which station is selected, the interface 26 sends a selection signal to each of the tuners 14, 18 and 22, which causes the appropriate tuner that is selected to output a signal to an audio generation system 28. The audio generation system 28 takes the particular frequency or encoded signal from the selected tuner 14, 18 or 22, and generates an audio signal that is then applied to the radio speakers (not shown) for listening. The depiction of the tuners 14, 16 and 22, the user interface 26, and the audio generation system 28 is in a simplistic form for discussion purposes.

The selection signal from the user interface 26 is also applied to a carrier wave frequency determination system 30, according to the invention. Based on which station the user selects by the user interface 26, the carrier wave frequency system 30 will provide an output signal identifying that selection to a carrier wave generator 32. The carrier wave generator 32 then generates a unique carrier wave frequency for that particular output from the system 30. Each selected radio station that is being monitored has its own unique identification code in the frequency determination system 30, and each identification code has its own unique carrier wave frequency that is generated by the carrier wave generator 32. The carrier wave is applied to the antenna 20 where it is transmitted to the satellite. In one embodiment, each radio 10 tuned to the same station would transmit the same unique frequency signal at substantially the same power level. A frequency reference signal is applied from the satellite tuner 22 to the carrier wave generator 32 to align the carrier wave frequency with the receiver in the satellite so that various carrier wave frequencies identifying the individual stations can be more closely spaced, as would be understood to those skilled in the art.

Depending on which radio station the user selects, whether it be an AM station, an FM station, or a digital satellite broadcast station, the radio 10 will transmit a unique carrier wave frequency identifying the station. In general, if a transmitter (radio 10) is in state k out of a possible n states, it transmits a low power carrier tone at frequency $f_k$, where n distinct frequencies $f_1-f_n$ are defined in the available spectrum. The carrier can be transmitted periodically depending on the particular application to conserve resources. The carrier wave transmitted by the radio 10 is received by a satellite in one embodiment. However, the use of a satellite to receive the state information from the radio 10 is by way of a non-limiting example, in that a ground-based receiver can also be used to receive the state information from the radio 10. Since each radio 10 will transmit a carrier wave, the narrowness of the carrier wave spectrum required is only limited by the stability and accuracy of generation of the transmission frequency, and by the rate that each radio 10 changes between states. Thus, for a large number of radios 10, the required band width for this scheme is negligible compared to the bandwidth necessary to support large numbers of individual communication links.

For a practical application, the carrier wave generator 32 will provide 20–30 different carrier wave frequencies, one for each of the stations being monitored. The carrier wave generator 32 will generate frequency signals in the 2–3 GHz range, where each frequency signal has a bandwidth of about 1 kHz to separate the different carrier wave frequencies. If one of the radios 10 is turned off, it will stop sending the particular carrier wave, and thus the power contribution from that radio 10 will stop, and the overall transmitted power from all of the radios will decrease. Likewise, if the user selects a different radio station, the carrier wave transmitted by that radio will change, and the overall power for one frequency will decrease and the overall power for another frequency will increase.

Figure 2:
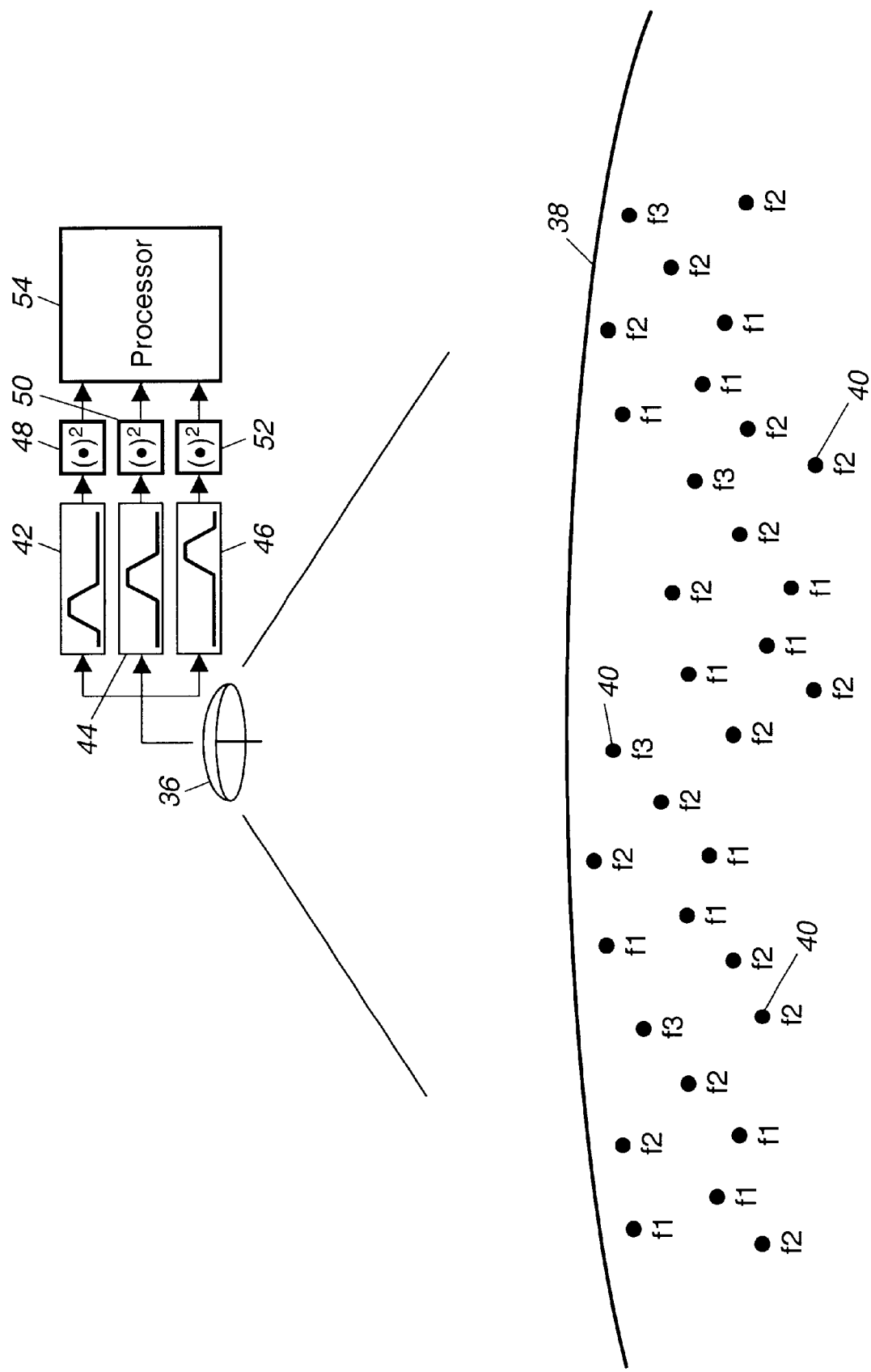
FIG. 2 is a block diagram of a communications system incorporating a plurality of the radios shown in FIG. 1, according to the invention.

FIG. 2 shows a diagram of a communications system 34 of the invention from the satellite perspective, according to the invention. A satellite 36 orbiting the Earth 38 monitors a certain predefined reception area on the Earth 38. A plurality of radio receiver locations 40 are depicted on the Earth 38, where each location 40 represents a radio 10. Each location 40 is designated with a frequency $f_1$, $f_2$, or $f_3$ as the carrier wave generated by the carrier wave generator 32 for that radio 10. Only three frequencies are shown for discussion purposes. Of course, in a practical application, the satellite 36 will monitor many more than three different frequencies and many more locations 40 (possibly millions of locations) will be transmitting signals. The satellite 36 would also transmit the radio signals received by the antenna 20 and deciphered by the tuner 22.

The satellite 36 receives the carrier wave frequencies $f_1-f_3$ from the radio 10. All of the carrier wave frequencies $f_1$ combine to give a certain power contribution for that frequency, all of the carrier wave frequencies $f_2$ combine to give a power contribution for that frequency, and all of the carrier wave frequencies $f_3$ combine to give a power output for that frequency. Since all of the radios 10 emit the carrier waves at substantially the same power level, each contribution to the total power from each radio 10 is about the same.

The satellite 36 includes a first frequency bin filter 42 that only passes the carrier wave signals at frequency $f_1$, a second frequency bin filter 44 that only passes the carrier wave signals at frequency $f_2$, and a third frequency bin filter 46 that only passes the carrier wave signals at frequencies $f_3$. The filters 42–46 can be any suitable narrow bandpass filter known to those skilled in the art that effectively passes the signals in the bandwidth of interest. In this depiction, many carrier waves arrive at each frequency bin filter 42–46, and will be phase incoherent relative to each other. Therefore, a measurement of the total power in each frequency bin will be proportional to the number of transmitters transmitting in that frequency bin, and is thus a measure of the number of transmitters in the state associated with that frequency bin.

By measuring the total power output from each frequency bin filter 42–46, an estimate of the number of radios 10 transmitting each frequency $f_1$–$f_3$ can be provided, and thus the number of radios tuned to a given station can be obtained. To do this, the output from the filter 42 is applied to a power detector 48, the output of the filter 44 is applied to a power detector 50, and the output of the filter 46 is applied to a power detector 52. The power detectors 48–52 provide a measurement of the power received by the satellite 36 at the particular bandwidth passed by each of the filters 42–46. In one embodiment, the power detectors 48–52 are square law power detectors, known to those skilled in the art. However, any kind of power detector suitable for digital or analog power detection of the type described herein can be used in accordance with the teachings of the present invention.

Figure 3:
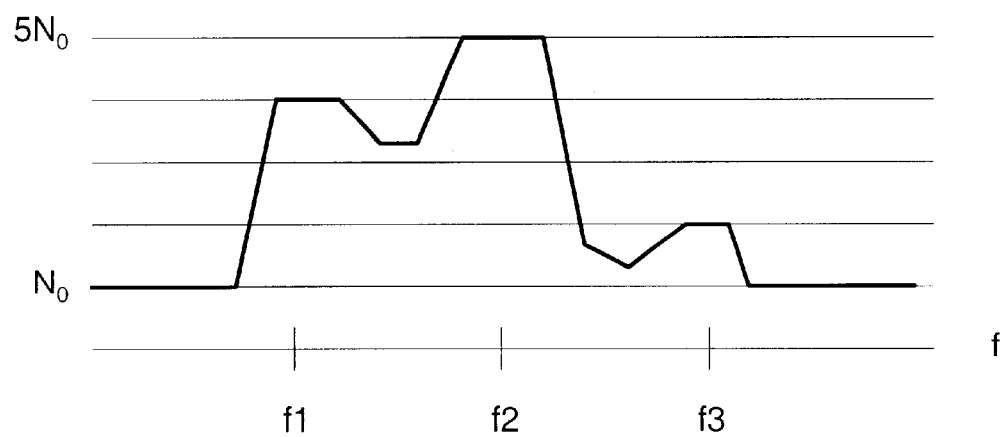
FIG. 3 is a graph depicting a power spectrum for determining which radios are tuned to what frequency in accordance with the invention.

The power detection signal from each of the power detectors 48–52 is then applied to a processor 54 that converts the analog power signal to a digital signal, and provides an estimation of the number of transmissions for each frequency $f_1$–$f_3$. In one embodiment, the estimation of the number of transmissions at each frequency $f_1$–$f_3$ is based on the expected receiver noise power and the expected received power of a single transmission from a radio 10. In other words, because the noise of the receiver processing the frequency signal is known, and the power of each carrier frequency transmission from each radio 10 is known, the number of transmissions at each frequency $f_1$–$f_3$ can be calculated. In the processor 54, the expected receiver noise power is subtracted from the measured power level at each frequency, and then divided by the expected received power from a single transmitter to give the number of transmissions at each frequency $f_1$–$f_3$. FIG. 3 shows a graph of how the estimation of the number of the transmissions for each frequency is made according to one embodiment of the invention. Each of the frequencies $f_1$, $f_2$, and $f_3$ is depicted on the horizontal axis, and the power detected at each frequency is depicted on the vertical axis. Each separation of power is based on the receiver noise $N_0$. If no radio 10 is transmitting a particular carrier wave frequency, then the total output power at that frequency would be $N_0$. In this representation, twelve radios 10 are transmitting at carrier wave frequency $f_1$, sixteen radios 10 are transmitting at carrier wave frequency $f_2$, and four radios 10 are transmitting at carrier wave frequency $f_3$. Based on the power for each transmission, each power contribution from each radio 10 at a particular frequency is known to be one-quarter of $N_0$. Therefore, the total power output contribution for twelve radios transmitting at frequency $f_1$ is $4N_0$, the total power output for sixteen radios transmitting at frequency $f_2$ is $5N_0$, and the total power output for four radios transmitting at frequency $f_3$ is $2N_0$. As the number of radios transmitting at the various frequencies changes over time, the total power output at each frequency $f_1$–$f_3$ will change accordingly based on the noise $N_0$. The satellite 36 can download the information concerning the number of radios tuned to a particular station to a ground based station (not shown) along with the normal telemetry information from the satellite 36 that gives the satellite's vital information.

The transmit power required for each radio 10 can be determined from the desired accuracy in counting the number of transmissions in each state. It is not necessary in the scheme of the invention to have sufficient power for a single transmitter to be detectable. This would have been have necessary if individual communications were employed. For example, consider a case where the uncertainty in the number of transmitters in a particular state can be as many as one hundred transmissions. The transmit power can then be set so that the received power from one radio 10 is roughly 1/100th of the noise power in the detector.

The foregoing discussion discloses and describes merely exemplary embodiments of the present invention. One skilled in the art would readily recognize from such discussion, and from the accompanying drawings and claims, that various changes, modifications and variations can be made therein without departing from the spirit and scope of the invention as defined in the following claims.

What is claimed is:

1. A radio comprising:
   at least one antenna receiving radio station signals;
   at least one tuner that tunes the radio to a selected radio station signal received by the at least one antenna;
   a user interface that outputs a radio station select signal that selects the radio station signal to be tuned;
   a frequency determination system responsive to the radio station select signal from the user interface, said frequency determination system generating a coded signal identifying the selected station; and
   a frequency generator receiving the coded signal from the frequency determination system and outputting a unique frequency signal based on the coded signal, said radio transmitting the unique frequency signal to be received by a receiver.

2. The radio according to claim 1 wherein the at least one antenna includes an AM receive antenna, an FM receive antenna, and a satellite receive/transmit antenna, and the at least one tuner includes an AM tuner, an FM tuner, and a satellite tuner, said user interface providing the radio station select signal to each of the AM tuner, the FM tuner and the satellite tuner.

3. The radio according to claim 1 wherein the at least one antenna is a satellite receive/transmit antenna and the at least one tuner is a satellite tuner, said receive/transmit antenna receiving satellite signals from the satellite that are tuned by the satellite tuner, and said receive/transmit antenna receiving the frequency signals from the frequency generator for transmission.

4. The radio according to claim 1 wherein the radio continually transmits the unique frequency signal, and maintains transmitting the unique frequency signal as long as the radio is on.

* * * * *